UNITED STATES PATENT OFFICE.

HEINRICH AUGUST BERNTHSEN, OF MANNHEIM, AND PAUL JULIUS, OF LUDWIGSHAFEN, GERMANY, ASSIGNORS TO THE BADISCHE ANILIN AND SODA FABRIK, OF LUDWIGSHAFEN, GERMANY.

BLUE DYE.

SPECIFICATION forming part of Letters Patent No. 558,344, dated April 14, 1896.

Application filed February 14, 1896. Serial No. 579,301. (Specimens.) Patented in England February 2, 1893, No. 2,370; in France April 10, 1893, No. 229,263, and in Germany April 18, 1893, No. 82,572.

*To all whom it may concern:*

Be it known that we, HEINRICH AUGUST BERNTHSEN, a subject of the King of Prussia, residing at Mannheim, in the Grand Duchy of Baden, and PAUL JULIUS, a subject of the Emperor of Austria-Hungary, residing at Ludwigshafen-on-the-Rhine, in the Kingdom of Bavaria, Empire of Germany, have invented new and useful Improvements in the Manufacture of a new Substantive Blue Dye, (for which patents have been obtained in Germany, No. 82,572, dated April 18, 1893; in England, No. 2,370, dated February 2, 1893, and in France, No. 229,263, dated April 10, 1893,) of which the following is a specification.

In the year 1893 we invented a new amidonaphtholsulfo-acid, which is known as the "1 amido 5 naphthol 7 sulfo-acid."

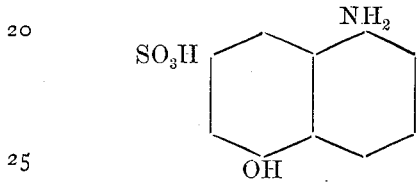

(See English Patent No. 2,370, of 1893.)

The present invention relates to the manufacture of a new substantive blue dye, which is chemically a mixed disazo-dye derived from tetrazo-dianisidin, the aforesaid amidonaphtholsulfo-acid, (combined in alkaline solution,) and 1.4 or 1.5 naphtholsulfo-acid. The chemical constitution of the new dye can be represented by the following scheme:

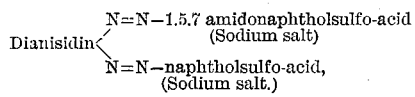

The following example will serve to illustrate the nature of the invention and the manner in which it can be carried into practical effect. The parts are by weight. Diazotize about twenty-four and a half (24½) parts of dianisidin in the well-known way and add sufficient cold dilute soda solution to the diazo solution to render it alkaline, and then add immediately an alkaline solution in soda of about twenty-four (24) parts of the 1.5.7 amidonaphtholsulfo-acid. A blackish precipitate of the intermediate product which is soon formed will separate out. To the suspension so obtained add after a short time a solution of about twenty-five (25) parts of the sodium salt of the 1.4 or 1.5 naphtholsulfo-acid. Stir for about twelve hours. Then heat to boiling, precipitate with common salt, filter, press, and dry.

Our new coloring-matter in the form of sodium salt is a blue-black powder soluble in water, giving a pure blue solution slightly soluble in ordinary alcohol. Dilute acids precipitate the color from the solutions as a violet precipitate. It is practically insoluble in benzene. If a little alkali be added to the aqueous solution, no change in color can be noticed; but more alkali produces a redder shade. The solution in concentrated sulfuric acid is bluish-green. On treatment with nitrous acid on the fiber the color is turned into a slightly more violet diazo body, which on combining with beta-naphthol yields rather deeper and more violet shades than the original blue.

What we claim as new, and desire to secure by Letters Patent, is—

The new substantive coloring-matter which is chemically a mixed disazo-dye and can be derived from tetrazo-dianisidin, 1.5.7 amidonaphtholsulfo-acid combined in alkaline solution and alphanaphtholsulfo-acid (1.4; 1.5), and which in the form of sodium salt is soluble in water, slightly soluble in alcohol, but is precipitated by dilute acids, and which on treatment with nitrous acid on the fiber yields a more violet diazo compound which combines with beta-naphthol and so imparts rather deeper and more violet shades to the material than the original blue, all substantially as described.

In testimony whereof we have hereunto set our hands in the presence of two subscribing witnesses.

HEINRICH AUGUST BERNTHSEN.
PAUL JULIUS.

Witnesses:
ERNEST F. EHRHARDT,
ADOLPH REUTLINGER.